United States Patent
Koveal et al.

[11] Patent Number: 5,968,465
[45] Date of Patent: *Oct. 19, 1999

[54] PROCESS FOR REMOVAL OF HCN FROM SYNTHESIS GAS

[75] Inventors: Russell J. Koveal; Kenneth L. Riley, both of Baton Rouge; Keith E. Corkern, Denham Springs, all of La.

[73] Assignee: Exxon Research and Engineering Co., Florham Park, N.J.

[*] Notice: This patent is subject to a terminal disclaimer.

[21] Appl. No.: 08/929,314

[22] Filed: Sep. 19, 1997

Related U.S. Application Data

[63] Continuation-in-part of application No. 08/636,425, Apr. 23, 1996, abandoned.

[51] Int. Cl.$^6$ ...................................................... B01D 53/54
[52] U.S. Cl. ........................................... 423/236; 252/373
[58] Field of Search ............................... 423/236; 252/373

[56] References Cited

U.S. PATENT DOCUMENTS

| | | | |
|---|---|---|---|
| 4,740,361 | 4/1988 | Heyd et al. | 423/210 |
| 4,810,475 | 3/1989 | Chu et al. | 423/236 |
| 5,068,254 | 11/1991 | Posthuma et al. | 518/705 |
| 5,463,168 | 10/1995 | Audeh et al. | 423/236 |
| 5,466,427 | 11/1995 | Rumpf et al. | 423/236 |
| 5,660,807 | 8/1997 | Forg et al. | 423/236 |

FOREIGN PATENT DOCUMENTS

| | | | |
|---|---|---|---|
| 2157542 | 8/1996 | Canada | B01J 21/06 |
| 0757969A1 | 12/1997 | European Pat. Off. | C01B 3/58 |
| 4424695A1 | 1/1995 | Germany . | |
| 2159132 | 11/1985 | United Kingdom . | |
| 94/29004 | 12/1944 | WIPO . | |

*Primary Examiner*—Wayne Langel
*Assistant Examiner*—Peter DiMauro
*Attorney, Agent, or Firm*—Jay Simon; Jonathan N. Provoost

[57] ABSTRACT

Hydrogen cyanide is removed from an HCN containing gas, e.g., a gas containing $CO+H_2$, by contact with a metal oxide catalyst comprised of the oxides of molybdenum, titanium, and aluminum in the presence of water vapor, and subsequently water washing the resulting gas.

11 Claims, 3 Drawing Sheets

PROCESS FOR REMOVAL OF HCN FROM SYNTHESIS GAS

CROSS REFERENCE TO RELATED APPLICATIONS

This application is a Continuation-in-Part of U.S. Ser. No. 636,425, filed Apr. 23, 1996, now abandoned.

FIELD OF THE INVENTION

This invention relates to the removal of hydrogen cyanide, HCN, from synthesis gas streams. More particularly, this invention relates to the use of a composite catalyst for HCN removal from essentially sulfur free streams containing hydrogen and carbon monoxide.

BACKGROUND OF THE INVENTION

Synthesis gas, hydrogen and carbon monoxide, is used in a variety of hydrocarbon synthesis processes, e.g., Fischer-Tropsch. However, trace components that find their way into the synthesis gas are often poisons for hydrocarbon synthesis catalysts. An example of a trace component that poisons Fischer-Tropsch catalysts is hydrogen cyanide. This component is difficult to remove from synthesis gas because of its low solubility in common solvents, e.g., water, and because of its low concentration, usually less than about 100 ppm, removal by adsorption is difficult. Also, chemical removal by, for example, alkaline scrubbing, is hampered by the presence of other acidic materials, e.g., $CO_2$. Consequently, a need exists for the economic removal of HCN from synthesis gas at levels of at least about 95%, and particularly at temperatures similar to those employed in the hydrocarbon synthesis step.

SUMMARY OF THE INVENTION

In accordance with this invention hydrogen cyanide is substantially removed from an HCN containing gas, preferably a synthesis gas, by contacting the gas at HCN removal conditions with a composite metal oxide catalyst containing the oxides of molybdenum and titanium, and alumina in the presence of water vapor. A gas of reduced HCN content, such as synthesis gas, is then produced for use in subsequent hydrocarbon synthesis reactions, such as the Fischer-Tropsch reaction to prepare $C_5+$, preferably predominantly $C_{10}+$ hydrocarbons. Reaction conditions for HCN removal include elevated temperatures and elevated pressures, and at these conditions at least about 95% of the HCN contained in the synthesis gas feed stream is removed, preferably at least about 98%, more preferably at least about 99%, removal of HCN is obtained by this process. Subsequent to the contacting step, the gas is scrubbed with water to remove $NH_3$ originally present or as converted, for example, by hydrolysis, from HCN.

Preferably, the catalyst is characterized by the absence or substantial absence of Group VIII metals or the compounds, e.g., oxides, thereof.

Figure 1:
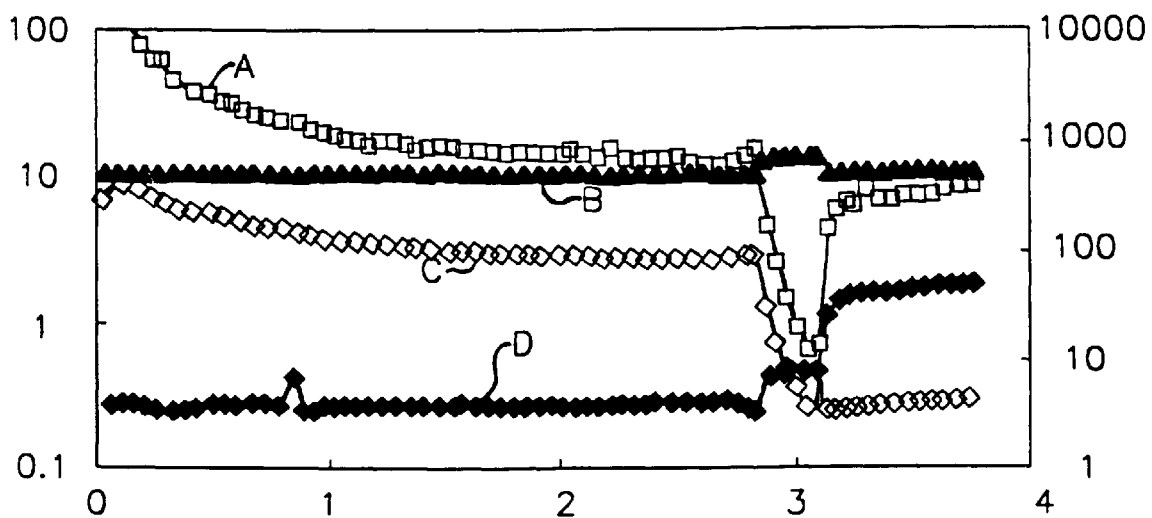
FIG. 1 shows the performance of a molybdenum-alumina catalyst, without hydrogen pre-treatment.
Figure 2:
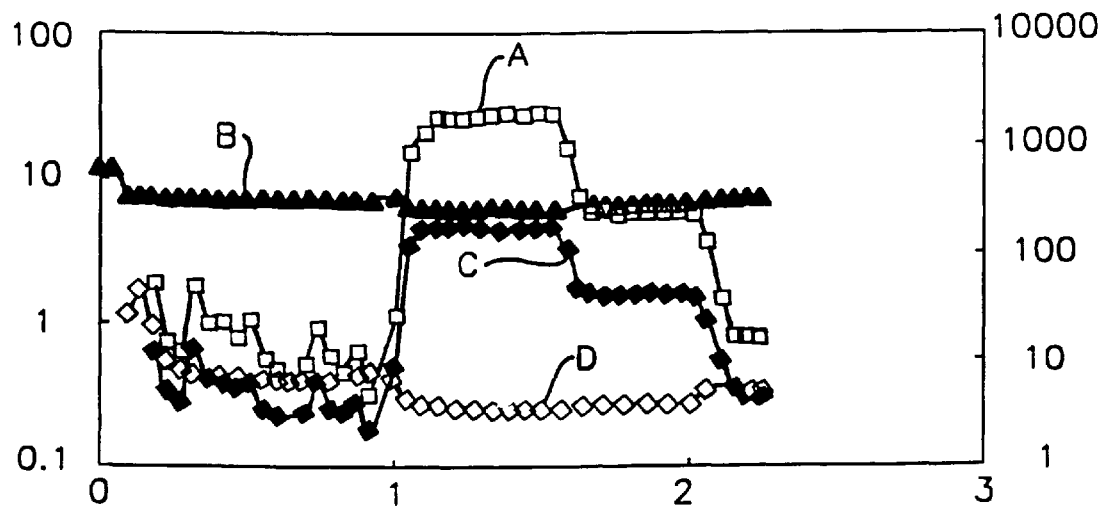
FIG. 2 shows the performance of a molybdenum-alumina catalyst with hydrogen pre-treatment.
Figure 3:
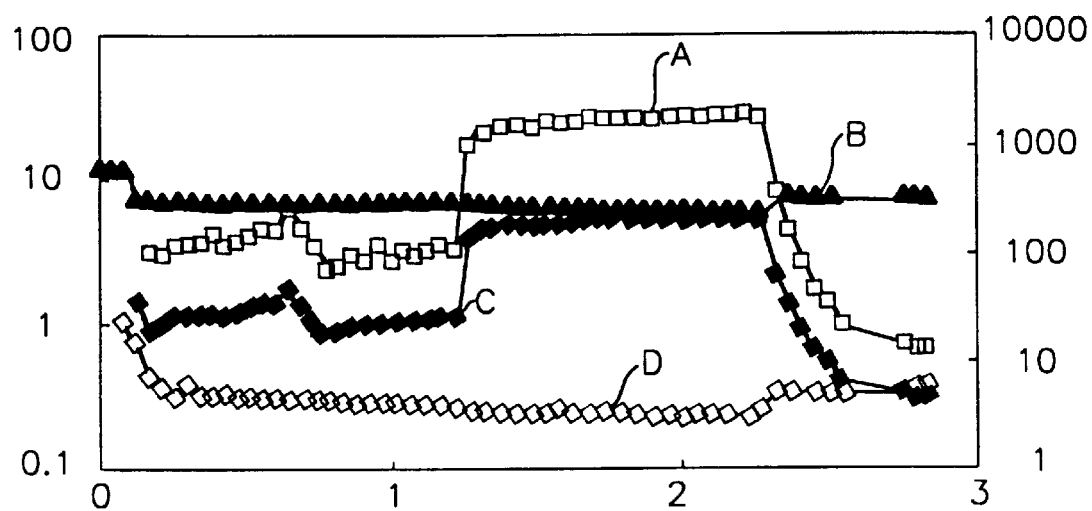
FIG. 3 shows the performance of a molybdenum-alumina catalyst with hydrogen pre-treatment at a higher temperature.
Figure 4:
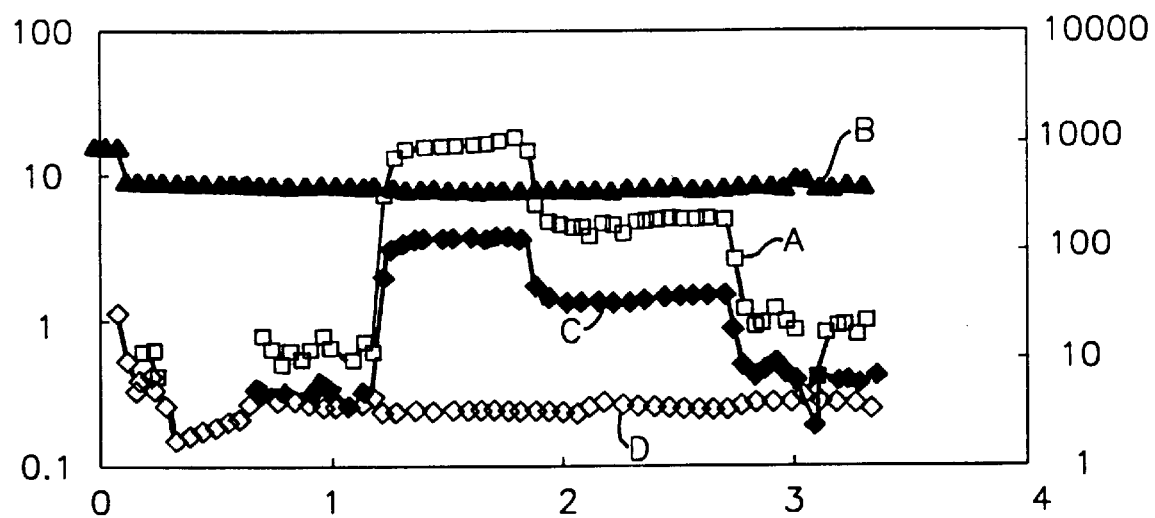
FIG. 4 shows the performance of a molybdenum-titania-alumina catalyst with hydrogen pre-treatment.
Figure 5:
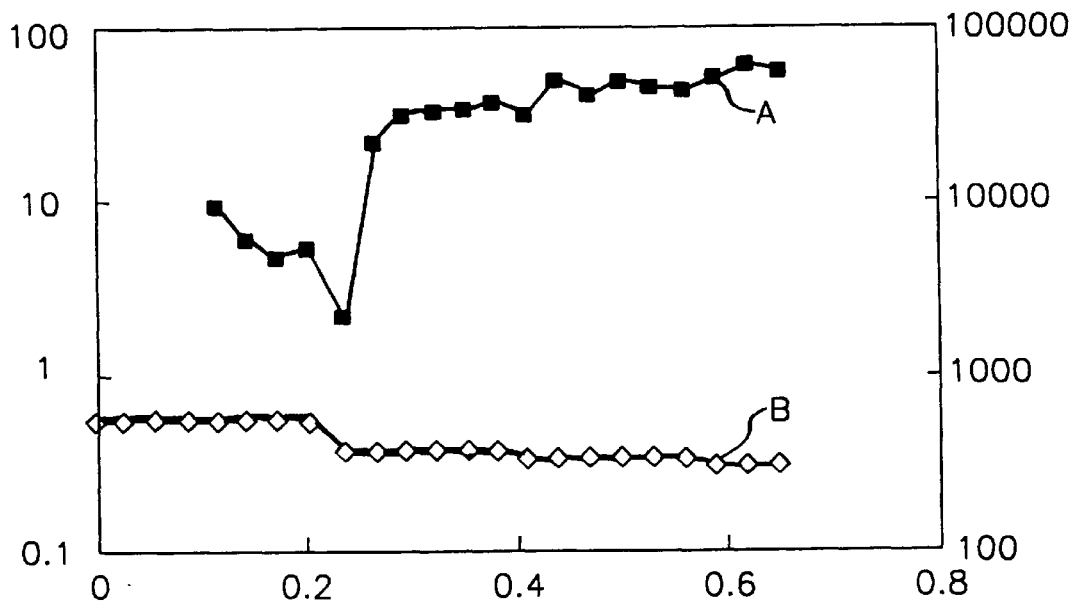
FIG. 5 shows the performance of a titania-alumina catalyst without hydrogen pretreatment.
Figure 6:
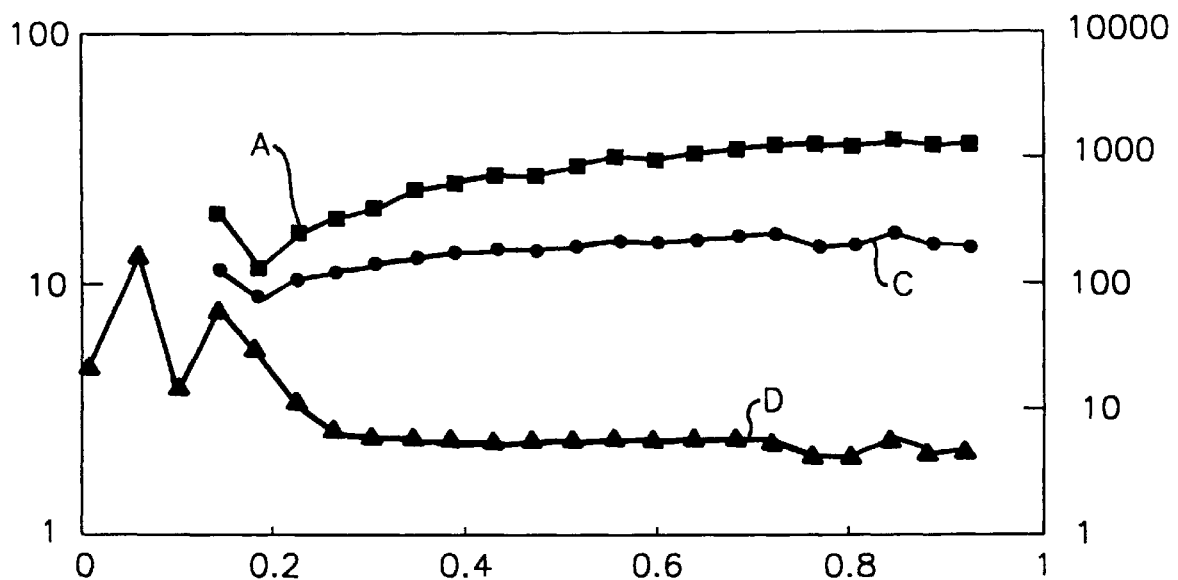
FIG. 6 shows the performance of a titania-alumina catalyst with hydrogen pre-treatment.

Curve A is always 100 (HCN out/HCN in), or % HCN conversion, Curve B is always temperature, Curve C is always ppm HCN, and Curve D is always ppm $CH_4$. In all figures the left ordinate is 100 (HCN out/HCN in), the abscissa is days on stream, and the right ordinate is ppm methane or ppm HCN in effluent.

The HCN removal process proceeds via the reaction of hydrogen cyanide with water:

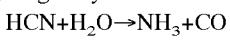

$$HCN+H_2O \rightarrow NH_3+CO$$

and whereas $NH_3$, ammonia, is also a Fischer-Tropsch catalyst poison, $NH_3$ can be readily removed, e.g., by a washing of the treated synthesis gas.

Feed gases for the process generally and primarily contain hydrogen, carbon monoxide and water vapor, while small amounts of $CO_2$ may also be present. The feed gas is essentially free of sulfur. That is, sulfur levels in the feed are generally about 10 ppm (wt) or less, preferably about 5 ppm or less, more preferably about 1 ppm or less, and most preferably less than about 50 wppb.

In a preferred embodiment, the catalyst is treated with hydrogen at elevated temperatures and pressures, thereby causing an increase in catalytic activity. While the metal oxides utilized in this invention are generally known as difficulty reducible oxides, there is evidence that at least a portion of the oxides of both molybdenum and titanium are in reduced oxidation states. It is unlikely, however, that the hydrogen treatment leads to the reduction of either of these metals to the elemental state, and the catalyst is essentially, and preferably devoid of any elemental metal. The alumina, acting in the manner of a support, is likely not reduced at all, alumina being a particularly difficult oxide to reduce.

The composite oxide catalyst generally contains >0 to 30 wt % molybdenum as the oxide, at least a portion of which is in the reduced valence state, i.e., less than the valence of +6, preferably 10–20 wt % oxide of molybdenum; >0 to about 30 wt % titanium as the oxide, at least a portion of which is in the reduced valence state, and preferably 4–20 wt %, more preferably 8–16 wt %, e.g., about 8 wt % of the oxide of titanium; the remainder being alumina.

The catalyst may be treated with hydrogen, or a hydrogen containing stream, although the effects of hydrogen treatment are not always manifest. Because the materials of the composite catalyst are essentially difficulty reducible oxides, we believe that there is virtually no metal present in the zero valence state, e.g., less than 0.1 wt % zero valence metal. However, some of the molybdenum, in particular, and perhaps some of the titanium, may be in a reduced valence state after hydrogen treatment. When hydrogen treatment is effected, temperatures may range from about 200–600° C., preferably 230–550° C. for periods of about 1–24 hours.

The catalyst of the present invention may be readily prepared by depositing suitable sources of molybdenum and titanium on an alumina support. After deposition, for example, by impregnation or incipient wetness techniques, the material is dried, e.g., overnight at about 100–150° C., followed by calcination at temperatures of about 250–500° C., preferably 350–450° C. to produce the oxide form.

Suitable sources of molybdenum include ammonium heptamolybdate, ammonium molybdate, molybdenum trioxide; while suitable titanium sources include titanium isopropoxide, titanium oxychloride, titanium sulfate, titanium chloride, potassium titanium oxalate and other similar sources well known to those skilled in the art. However, chloride containing materials are preferably avoided since chlorides are poisons for Fischer-Tropsch processes; the process of this invention is then preferably conducted in the absence of chlorides. Water washing can often reduce chlorides to acceptably low levels.

The alumina may be any alumina useful as a catalyst support, including eta and gamma forms of alumina, and may have surface areas ranging from about 100–400 m$^2$/gm.

HCN removal can be carried out over a relatively wide temperature range, e.g., 150–400° C. However, the preferred temperature range is that compatible with the subsequent process step, e.g., Fischer-Tropsch processing, preferably 170–250° C., more preferably about 170–250° C., and still more preferably about 180–235° C. Pressures are similarly wide ranging, e.g., 1–100 bar, although preferred pressures are in the range of 10–50 bar, more preferably 15–40 bar.

The converted HCN and product NH$_3$ can then be removed from the feed synthesis gas by any applicable method well known to those skilled in the art, for example, water scrubbing or absorption onto a solid absorbent. The synthesis gas of relatively low HCN concentration may then be employed in a Fischer-Tropsch hydrocarbon synthesis process using shifting or non-shifting catalysts. Preferred suitable Fischer-Tropsch catalysts include non-shifting Group VIII metals, preferably cobalt or ruthenium in bulk or supported form. In supported form, supports may be silica, alumina, silica-alumina, or titania. Promoters may also be employed, e.g., zirconium, rhenium, hafnium, etc.

The process of this invention will be more fully appreciated by the following examples which serve to illustrate, but not limit, the invention.

CATALYST TESTING

The following general procedure was used for testing Catalysts A and C: A weighed amount of catalyst was mixed with 2 cc (about 2.7 gms) of 14×35 mesh crushed inert material (Denstone). This was placed in a 0.4 inch I.D. tubular stainless steel reactor. The catalyst/diluent was supported by a plug of Pyrex wool at the bottom of the reactor. On top of this bed, 4 cc (about 5.4 gms) of 14×35 mesh crushed Denstone was placed. A thermocouple was inserted into the bed for temperature control. The charged reactor was then placed into a vertically mounted infrared furnace and connected to supply and withdrawal tubing. The flow path was downflow, first through the diluent layer and then to the catalyst/diluent bed. Product analysis was by gas chromatography. HCN conversion was determined by comparison vs. an internal standard. Gases were supplied by electronic mass flow controllers. Water, HCN, and internal standard were supplied via a liquid feed pump. The liquid feed was mixed with the gas feed and vaporized in the upper section of the reactor.

All of the catalysts described below were prepared using an extruded alumina support. The properties of this support were:

| | |
|---|---|
| Surface Area | 169 m$^2$/gm |
| Pore Volume (H2P) | 0.725 ml/gm |
| Compacted Bulk Density | 0.50 gm/ml |
| Median Pore Diameter (Hg) | 13 mn |
| Shape | Asymmetric Quadralobe Major Diameter 1.40 mm Minor Diameter 1.14 mm |
| Average Extrudate Length | 4.6 mm |
| Non-volatile matter (%) | 90.7 |

The catalysts were prepared as follows:

Catalyst A

Ammonium heptamolybdate (22.229 gms) and citric acid (30.5 gms) were dry-mixed in a 300 ml flask. To this was added 60 ml of deionized water. The solution was mixed with mild heating until it was clear. Deionized water was then added to a final volume of 83.8 ml. This solution was added to 110.25 gms of the alumina extrudates. The flask was stoppered and allowed to sit overnight. It was then dried at 120° C. in flowing air for 4 hours and then calcined in air for 2 hours at 1000° F.

Catalyst B

Titanium Isopropoxide (42.028 gms) was dissolved with 30 ml of isopropyl alcohol in a 300 ml flask. Isopropyl alcohol was then added to bring the solution volume to 88 ml. Then 110.25 gms of the alumina extrudates were added to the solution in the flask. The flask was stoppered and shaken until all of the extrudates were wet. The wet extrudates were then put into an evaporation dish and dried in air at room temperature for 2 hours. The air dried extrudates were then further dried in an oven overnight. The extrudates were then calcined in air for 2 hours at 1000° F. Titanium isopropoxide (26.849 gms) was dissolved in isopropyl alcohol to give a total solution volume of 78 ml. To this, 97.2 gms of the above calcined extrudates were added and the flask stoppered. The flask was shaken until all of the extrudates were wet. The wet extrudates were then put into an evaporation dish and dried in air at room temperature for 2 hours. The air dried extrudates were then further dried in an oven at 120° C. in flowing air overnight. The extrudates were then calcined in air for 2 hours at 1000° F. to give Catalyst B.

Catalyst C

Ammonium molybdate (9.704 gms) and citric acid (12.8 gms) were dry-mixed in a 250 ml flask. To this was added 25 ml of deionized water. The solution was stirred with mild heating until it was clear. Deionized water was then added to give a final solution volume of 42 ml. While the solution was still warm, 50.0 gms of dry Catalyst B was added to the flask. The flask was stoppered and shaken until all of the catalyst particles were wet. The stoppered flask was allowed to sit overnight. The catalyst then was put in an evaporation dish and dried in flowing air at 120° C. for 4 hours. The dried catalyst was then calcined at 1000° F. in air for 2 hours to give Catalyst C.

Catalyst D

COMPARATIVE EXAMPLE

To activated alumina (LaRoche Chemicals A-2, surface area 299 m$^2$/gm, 0.65 gm/ml bulk density, 12×32 mesh) sufficient titanium oxychloride was added to give 10% by weight TiO$_2$. This material was calcined in air for 3 hours at 751° F. This material was then impregnated to incipient wetness with a water solution of ammonium heptamolybdate to give a loading of 7.5 wt % MoO3. This material was dried in air at 220° F. and then calcined in air at 751° F. for 3 hours. This material was then crushed to <150 microns to give Catalyst D.

Example 1

Catalyst A Without Prior Reduction

Catalyst A (1.08 gms, 2 cc) was charged as described above to the reactor. Gas flows were established and the reactor temperature was set at 450° F. Liquid flow was then established. The operating conditions were:

| Feed Gas Composition | |
|---|---|
| Hydrogen | 44.1 mole % |
| Carbon Dioxide | 8.3 mole % |
| Water | 19.1 mole % |
| Argon | 9.1 mole % |
| Carbon Monoxide | 18.8 mole % |
| HCN | 637 ppm |
| Pyrrole (Internal Std) | 50 ppm |
| Pressure | 320 psig |
| GHSV | 10360 1/hr |

Results of this operation are shown in the FIG. 1. HCN conversion improved with time on stream. Increasing the temperature to 650° F. resulted in HCN conversion of >99%. A portion of this activity was retained when the temperature was reduced back to 450° F., suggesting the catalyst activation was not complete at the end of the first 450° F. period. At 450° F. the methane content of the product gas was about 5 ppm, comparable to the methane observed at 450° F. with only inert Denstone in the reactor (blank run). Methane at 650° F. was about 8 ppm, showing a net methane make of 3 ppm.

Example 2

Catalyst A With Prior Reduction by Hydrogen at 850° F.

Catalyst A (1.08 gms, 2 cc) was charged as described above to the reactor. Hydrogen flow was established (9435 GHSV) and the temperature increased to 850° F. The reactor was held for two hours at this condition. The pressure averaged 158 psig. At the end of this period, the reactor was cooled under flowing hydrogen to 450° F. and the pressure increased to 320 psig. The color of the catalyst changed from pale yellow to black indicating a lowered oxidation state of at least a portion of the molybdenum. The other gas flows and liquid flow were then established. The operating conditions were:

| Feed Gas Composition | |
|---|---|
| Hydrogen | 43.0 mole % |
| Carbon Dioxide | 8.5 mole % |
| Water | 19.0 mole % |
| Argon | 9.5 mole % |
| Carbon Monoxide | 19.3 mole % |
| HCN | 640 ppm |
| Pyrrole (Internal Std) | 50 ppm |
| Pressure | 320 psig |
| GHSV | 10590 1/hr |

The catalyst showed very high HCN conversion immediately, in contrast with the previous example where a "break-in" period was apparent. Furthermore, the activity at 450° F. was significantly improved. In Example 1 the best HCN conversion at 450° F. was 91.8%. In this example HCN conversion at 450° F. was 99.1%. Activity maintenance was also good. The final test temperature was 450° F. and HCN conversion was as high as during the initial part of the test at 450° F.

Example 3

Catalyst A With Prior Reduction by Hydrogen at 1000° F.

Catalyst A (1.08 gms, 2 cc) was charged as described above to the reactor. Hydrogen flow was established (9330 GHSV) and the temperature increased to 1000° F. The reactor was held for 2 hours at this condition. The pressure averaged 152 psig. At the end of this period, the reactor was cooled under flowing hydrogen to 400° F. and the pressure increased to 320 psig. The color of the catalyst changed from pale yellow to black, indicating a change in the oxidation state of at least a portion of the molybdenum. The other gas flows and liquid flow were then established. The operating conditions were:

| Feed Gas Composition | |
|---|---|
| Hydrogen | 43.8 mole % |
| Carbon Dioxide | 8.5 mole % |
| Water | 19.1 mole % |
| Argon | 9.4 mole % |
| Carbon Monoxide | 19.3 mole % |
| HCN | 670 ppm |
| Pyrrole (Internal Std) | 50 ppm |
| Pressure | 320 psig |
| GHSV | 10540 1/hr |

The results are shown in the figure. Similar to Example 2, the catalyst immediately showed good HCN conversion. The activities at all temperatures were marginally higher than in Example 2. Consistent with Examples 1 and 2, net methane make was very low.

A comparison of Example 1 with Examples 2 and 3 (in Table I) clearly shows prior reduction with hydrogen improves catalyst activity and that hydrogen reduction is preferred. A comparison of Examples 2 and 3 shows a small benefit for increasing reduction temperature to 1000° F. from 850° F.

Example 4

Catalyst C With Prior Reduction by Hydrogen at 850° F.

Catalyst C (1.14 gms, 2 cc) was charged as described above to the reactor. Hydrogen flow was established (9460 GHSV) and the temperature increased to 850° F. The reactor was held for 2 hours at this condition. The pressure averaged 155 psig. At the end of this period, the reactor was cooled under flowing hydrogen to 400° F. and the pressure increased to 320 psig. The color of the catalyst changed from pale yellow to black, indicating a change in the oxidation state of at least a portion of the molybdenum. The other gas flows and liquid flow were then established. The operating conditions were:

| Feed Gas Composition | |
|---|---|
| Hydrogen | 43.8 mole % |
| Carbon Dioxide | 8.5 mole % |
| Water | 19.1 mole % |
| Argon | 9.4 mole % |
| Carbon Monoxide | 19.3 mole % |
| HCN | 670 ppm |
| Pyrrole (Internal Std) | 50 ppm |
| Pressure | 320 psig |
| GHSV | 10550 1/hr |

Similar to Example 2, the catalyst immediately showed good HCN conversion. The activities at all temperatures were significantly higher than in Example 2. Consistent with Examples 1 and 2, net methane make was very low. This example shows the combination of titania and molybdenum oxide on an alumina support provides a particularly active catalyst for HCN removal from syngas. Comparison of the first and second periods at 400° F. shows good activity maintenance, with only a slight loss occurring over the test period.

Example 5

Catalyst D Without Prior Reduction

Catalyst D (0.4625 gms, 0.5 cc) was mixed with crushed high purity tubular alpha alumina (10.72 gms, 5.5 cc). This was placed in a 0.4 inch I.D. tubular stainless steel reactor. The catalyst/diluent was supported by a plug of Pyrex wool at the bottom of the reactor. A thermocouple was inserted into the bed for temperature control. The charged reactor was then placed into a vertically mounted infrared furnace and connected to supply and withdraw tubing. The flow path was downflow through the catalyst/diluent bed. Product analysis was by gas chromatography. HCN conversion was determined by comparison vs. an internal standard. Gases were supplied by electronic massflow controllers. Water, HCN, and internal standard were supplied via a liquid feed pump. The liquid feed was mixed with the gas feed and vaporized in the upper section of the reactor. The operating conditions were:

| Feed Gas Composition | |
|---|---|
| Hydrogen | 53.7 mole % |
| Carbon Dioxide | 6.4 mole % |
| Water | 18.2 mole % |
| Argon | 8.4 mole % |
| Carbon Monoxide | 13.3 mole % |
| HCN | 200 ppm |
| Pyrrole (Internal Std) | 500 ppm |
| Pressure | 320 psig |
| GHSV | 41000 l/hr |

The results are shown in the table. Very good HCN removal activity was achieved. HCN conversions were lower than those in Examples 1–4, but this is due to the much higher space velocity (41000 vs. 10500) in this Example. This example shows the benefit of higher alumina support surface area (299 m$^2$/gm vs. 169 m$^2$/gm for Catalysts A–C) and smaller particle size (<150 micro vs. 1/20" extrudates for Catalysts A–C).

Example 6

Catalyst B With prior Reduction by Hydrogen at 850° F.

Catalyst B (0.98 gm, 2 cc) was mixed with 2 cc (about 27 gms) of 14×35 mesh crushed inert material (Denstone). This was placed in a 0.4 inch I.D. tubular stainless steel reactor. The catalyst/diluent was supported by a plug of Pyrex wool at the bottom of the reactor. On top of this bed, 4 cc (about 5.4 gms) of 14×35 mesh crushed Denstone was placed. A thermocouple was inserted into the bed for temperature control. The charged reactor was then placed into a vertically mounted infrared furnace and connected to supply and withdraw tubing. The flow path was downflow, first through the diluent layer and then to the catalyst/diluent bed. Product analysis was by gas chromatography. HCN conversion was determined by comparison vs. an internal standard. Gases were supplied by electronic mass flow controllers. Water, HCN, and internal standard were supplied via a liquid feed pump. The liquid feed was mixed with the gas feed and vaporized in the upper section of the reactor.

Hydrogen flow was established (9830 GHSV) and the temperature increased to 850° F. The reactor was held for 2 hours at this condition. The pressure averaged 90 psig. At the end of this period, the reactor was cooled under flowing hydrogen to 450° F. and the pressure increased to 320 psig. The other gas flows and liquid flow were then established. The operating conditions were:

| Feed Gas Composition | |
|---|---|
| Hydrogen | 43.8 mole % |
| Carbon Dioxide | 8.5 mole % |
| Water | 18.6 mole % |
| Argon | 9.7 mole % |
| Carbon Monoxide | 19.4 mole % |
| HCN | 670 ppm |
| Pyrrole (Internal Std) | 50 ppm |
| Pressure | 320 psig |
| GHSV | 10830 l/hr |

The results are shown in the figure. As can be seen, HCN conversion initially decreased with time, finally stabilizing at about 70%.

Table I below shows a compilation of the results of Examples 1–6. Example 4, using a molybdenum-titania on alumina catalyst showed the best HCN reduction at the lowest temperature, i.e., the highest activity catalyst.

TABLE I

| Example | 1 | 2 | 3 | 4 | 5 | 6 |
|---|---|---|---|---|---|---|
| Catalyst | A | A | A | C | D | B |
| Reduction Temperature, ° F. | — | 850 | 1,000 | 850 | — | 850 |
| (° C.) | | (454.4) | (537.8) | (454.4) | — | (454.4) |
| Reduction, GHSV | — | 9,440 | 9,330 | 9,460 | — | 9,830 |
| Reaction, GHSV | 10,380 | 10,590 | 10,540 | 10,520 | 41,000 | 10,830 |
| HCN Conversion (%) at Temperature, ° F. (° C.) | | | | | | |
| 650 (343.5) | 99.3 | — | — | — | — | — |
| 550 (287) | — | — | — | — | 93.7 | — |
| 450 (232) | 91.8 | 99.1 | 99.2 | — | — | 69.1 |
| 400 (205) | — | 92.4 | 95.6 | 99.4 | — | — |
| 375 (190.5) | — | — | — | 95 | — | — |
| 350 (176.5) | — | 59.7 | 63.4 | 83 | 67.8 | — |
| 325 (163) | — | — | — | — | 55.7 | — |
| 300 (150) | — | — | — | — | 42.7 | — |
| First Order Rate Constant (1/hr) at Temperature, ° F. (° C.) | | | | | | |
| 650 (343.5) | 5,381 | — | — | — | — | — |
| 550 (287) | — | — | — | — | 10,811 | — |
| 450 (232) | 2,253 | 4,374 | 4,436 | — | — | 1,103 |
| 400 (205) | — | 2,239 | 2,703 | 4,359 | — | — |
| 375 (190.5) | — | — | — | 2,509 | — | — |
| 350 (176.5) | — | 743 | 819 | 1,441 | 3,540 | — |
| 325 (163) | — | — | — | — | 2,469 | — |
| 300 (150) | — | — | — | — | 1,633 | — |

We claim:
1. A process for reducing the HCN concentration of HCN containing gases containing less than 10 wt ppm sulfur comprising treating the gas, in the presence of water vapor and at HCN removal conditions with a catalyst comprising alumina and the oxides of molybdenum and titanium, wherein said catalyst is treated with hydrogen and at least a portion of the oxides of molybdenum and titanium are in a reduced valence state, the treating taking place in the substantial absence of Group VIII metals or compounds.

2. The process of claim 1 wherein the gas comprises a synthesis gas comprising hydrogen and carbon monxide.

3. The process of claim 2 wherein the alumina supports the oxides of molybdenum and titanium.

4. The process of claim 2 wherein the gas is essentially sulfur free.

5. The process of claim 2 wherein a synthesis gas of reduced HCN concentration is recovered and the recovered gas is water washed.

6. The process of claim 2 wherein HCN removal conditions include temperatures of about 150–400° C. and pressures of about 1–100 bar.

7. The process of claim 6 wherein the oxides of molybdenum and titanium are present in amounts of >0 to 30 wt % each.

8. The process of claim 5 wherein the gas is converted to hydrocarbons in the presence of a Fischer-Tropsch catalyst.

9. The process of claim 2 wherein HCN removal conditions include temperatures of about 170–250° C.

10. The process of claim 2 wherein the synthesis gas contains less than about 50 wppb sulfur.

11. The process of claim 2 conducted in the absence of chlorides.

* * * * *